307/425 XR 3,689,779

United Sta[tes Patent]

Schickle

[15] 3,689,779
[45] Sept. 5, 1972

[54] CONTROLLED GUNN-EFFECT DEVICE

[72] Inventor: Gerhard Schickle, Brudenerstr 22, 715 Backnang/Wurttenberg, Germany

[22] Filed: Oct. 15, 1971

[21] Appl. No.: 189,596

Related U.S. Application Data

[63] Continuation-in-part of Ser. No. 761,684, Sept. 23, 1968, Pat. No. 3,621,306.

[30] Foreign Application Priority Data

Sept. 29, 1968 Germany..........P 15 91 725.6

[52] U.S. Cl. .................307/299, 307/88.3, 307/218, 307/260, 317/234 V, 330/5, 330/34, 331/107 G

[51] Int. Cl. ...............................................H03k 3/02

[58] Field of Search.307/299; 317/234 V; 331/107 G

[56] References Cited

UNITED STATES PATENTS 3,621,306 11/1971 Schickle....................307/299

*Primary Examiner*—Roy Lake
*Assistant Examiner*—Darwin R. Hostetter
*Attorney*—George H. Spencer et al.

[57] ABSTRACT

A Gunn-effect device in which the active layer of the semiconductor body is provided with a suitable recess, hole or opening which extends through the active layer in a direction perpendicular to the direction of drift movement of the charge carriers. Preferably at least one contact is provided within the bore which cooperates with another contact disposed on the opposite edge of the active layer. The active layer of the semiconductor body may, for example, be circular, rectangular or oval, and may if desired include a plurality of pairs of contacts, one contact of each pair being within the hole and the other contact being on the edge of the active layer.

10 Claims, 14 Drawing Figures

3689779
OR IN 307/299R

Inventor
Gerhard Schickle

By Spencer & Kaye
Attorneys

Inventor
Gerhard Schickle
By Spencer & Kaye
Attorneys.

INVENTOR
Gerhard Schickle

BY Spencer & Kaye
ATTORNEYS

PATENTED SEP 5 1972 3,689,779

Inventor

Gerhard Schickle

By Spencer & Kaye

Attorneys

CONTROLLED GUNN-EFFECT DEVICE

CROSS-REFERENCE TO RELATED APPLICATION

This application is a continuation-in-part of applicant's copending U.S. patent application Ser. No. 761,684, filed Sept. 23, 1968, now U.S. Pat. No. 3,621,306.

BACKGROUND OF THE INVENTION

The present invention relates to a semiconductor device which produces electromagnetic oscillations and which comprises essentially a monocrystalline semiconductor body of predetermined dimensions, preferably a III–V-semiconductor crystal. When an electric field whose strength exceeds a critical value is applied across this crystal, a negative resistance is formed within the semiconductor body due to the high electric field zone which builds up in the crystal and which preferably propagates through the crystal. This effect has become known as the Gunn-effect, and is used for the generation of electromagnetic oscillations. This discovery is described by J. B. Gunn in an article entitled "Microwave Oscillations of Current in III-V-Semiconductors" appearing on pages 88 to 91 of *Solid State Communications*, No. 1, 1963.

More particularly, the Gunn-effect is utilized in oscillators and amplifiers designed to operate in the upper GHz range. The first Gunn-effect device consisted of a crystal in the form of an active layer of n-type gallium-arsenide. The frequency of the oscillation was dependent only on the thickness of the active semiconductor layer between the electrodes which were conductively connected with the semiconductor and which produced the necessary electrical field (about 3,000 V/cm).

According to recent developments, the semiconductor body was so doped and operated that the frequency of the oscillations no longer depended on the distance between the electrodes, so that still higher frequencies could be obtained, or so that, by providing thicker crystal layers, the device could be operated at higher power. This method is known as the LSA mode, an abbreviation derived from "limited space-charge accumulation."

According to another development, the negative resistance obtained from the Gunn-effect is controlled by means of at least one control electrode arranged at the surface of the active layer, this control electrode having an appropriate control voltage applied to it.

It has also been found that the wave shape of the current flowing through the external circuit of the device could be influenced by bevelling or slotting the edge of the semiconductor body.

SUMMARY OF THE INVENTION

The above notwithstanding, the use to which known Gunn-effect devices can be put is limited by various factors inherent in the design and operation of such devices. It is, therefore, the primary object of the present invention to provide a way in which to make it possible to use a Gunn-effect device in further fields of application, namely, to provide a further way in which to control the negative resistance formed in the crystal and thereby the microwave oscillations.

In accordance with the present invention, the above object is achieved by providing the active layer of a Gunn-effect device with at least one recess which influences the direct current electric field zone. This recess extends at right angles to the direction of drift of charge carriers in the active layer.

According to the basic embodiment of the invention the Gunn-effect device according to the invention comprises a semiconductor body having a hole which extends through the active layer of the body in a direction perpendicular to the direction of drift movement of the charge carriers therein. At least one contact, which preferably serves as a cathode, is provided in the hole and a further contact, which serves as an anode, is provided on the edge of the active layer opposite the first contact. According to the basic embodiment of the invention the semiconductor body is circular or rectangular and the hole is similarly shaped and in the center of the body whereby a coaxial arrangement is achieved.

According to a further feature of the invention, at least two pairs of contacts for the active layer of the semiconductor body are provided, with one contact of each pair being in the hole and the other contact of each pair being on the edge of the active layer and opposite the contact in the hole.

According to a further embodiment of the invention, the semiconductor body and the hole are disc shaped, but the hole is not in the center of the body. At least two pairs of contacts are provided with the dimensions of the semiconductor body between the contacts of each pair being different, whereby two different frequencies or amplifications can be simultaneously achieved from the same semiconductor body.

According to still a further embodiment of the invention, the semiconductor body is elliptically shaped and the hole is centrally disposed. At least two pairs of contacts are provided with one pair of contacts being along the major axis of the ellipse and the other pair of contacts being along the minor axis of the ellipse.

DESCRIPTION OF THE PREFERRED EMBODIMENTS

Figure 1A:
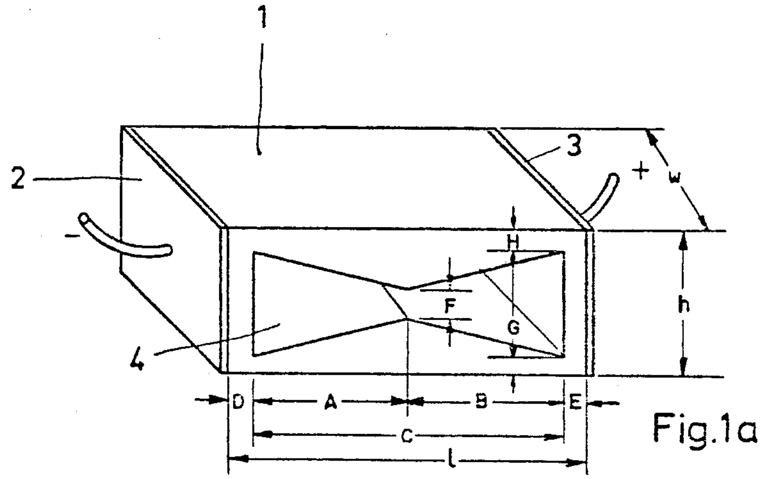
FIG. 1*a* is a perspective view of one embodiment of a Gunn-effect device according to the present invention.
Figure 1B:
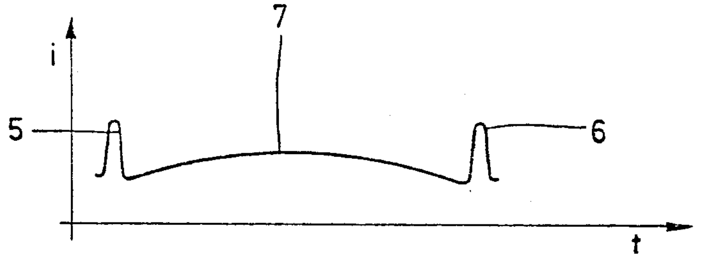
FIG. 1*b* is a current/time plot showing the wave shape of a current flowing in the external circuit connected to the Gunn-effect device shown in FIG. 1*a*.

Referring now to the drawings and first to FIG. 1*a*, the same shows a Gunn-effect device having a block shaped semiconductor body 1 having two electrodes 2 and 3 which are in surface-to-surface ohmic contact with opposite sides of the semiconductor body 1. When a suitable electric field is applied across the body 1, a differential resistance is produced in the body 1 due to the build up of a so-called high electric field zone which propagates preferably entirely through the semiconductor body and which, when it arrives at the anode 3, produces a current pulse 6 in the external circuit connected to the device, as shown in FIG. 1*b* on current axis *i*. If the applied field strength is above the critical field strength needed to trigger oscillations, the process is repeated. In FIG. 1*b*, it was assumed that the device was not being operated in the above-mentioned LSA mode, so that the output pulses 5 and 6, which schematically represent the microwave oscillations, are spaced from each other, on the time axis *t*, a distance that corresponds to the time it takes for the high field zone to traverse the semiconductor body 1.

According to the present invention, the semiconductor body 1 is provided with a recess, hole or bore 4 which influences the oscillation that is being generated. This influence which the bore 4 has on the oscillation is shown by the distortion of the current, shown in FIG. 1*b* at 7. The recess is arranged at right angles to the direction of drift of the charge carriers in body 1 and parallel to the two electrodes 2 and 3. By so positioning the bore, pulses or particular current shapes can be obtained by appropriately selecting the cross section and the location of the bore. One field of application of an oscillator incorporating such a Gunn-effect device is to identify a number of objects flying at high speeds, since the large variety of pulse shapes, possibly by merely changing the shape of the bore 4, makes it readily possible to distinguish between the different objects.

The embodiment shown in FIG. 1 can be modified in that the semiconductor body need not have a constant cross section. Instead, the cross section of the body, preferably the cross section between the anode and cathode, can vary, either constantly or in a step-wise manner. One practical variation is to increase the effective cross section, taking the bore of hole in consideration, in the direction of drift of the charge carriers.

As described so far, the size and position of the bore was used so as directly to influence the oscillations. According to a further feature of the present invention, the bore can be used so as indirectly to influence the oscillations. For example, the recess may extend approximately in the direction of drift of the charge carriers and means can be coupled into the recess for influencing the high field zone. These means can be passive and/or active elements such as resistors, capacitors, inductances or oscillators, voltage sources, respectively. Alternatively, the oscillations can be controlled by applying a heat field or high-frequency field to the device via the bore or hole, or by means of an electron beam or photon beam which is directed through the bore.

According to yet another feature of the present invention, the bore or only the walls thereof are at least partially contacted, thus giving even greater flexibility insofar as controlling the oscillations is concerned. This contact may be any type of contact, such as an ohmic contact, an insulated contact, or a contact which forms a pn-junction. In each case, the contacted bore is used to control the oscillations, and this, in turn, does not depend on the position of the bore in the semiconductor body.

According to a still further feature of the present invention, the cathode and anode of the device can be constituted by a contacted bore which is connected with a suitable direct current source.

Figure 2:
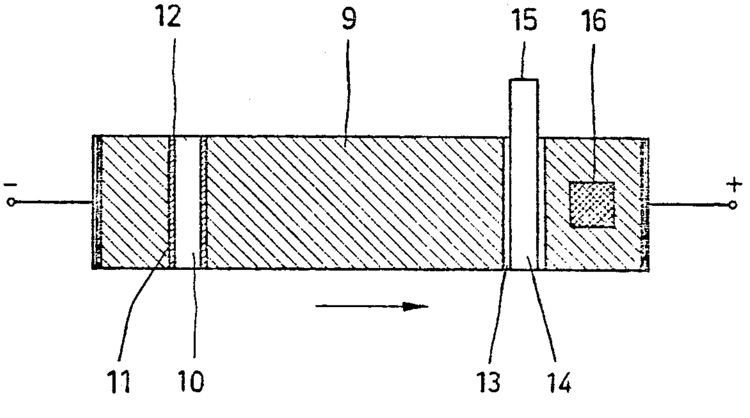
FIG. 2 is a sectional view of another embodiment of a Gunn-effect device according to the present invention, the same incorporating a plurality of holes or bores.

In the embodiment of FIG. 2, there is shown a semiconductor body 9 which, in the plane of the drawing, has the same dimensions between the cathode and anode. Here, the oscillations are controlled indirectly through the bores or holes 10, 13 and 16. In order to show the multitudinous variations and modifications to which the present invention is susceptible, the bore 10 is shown as being metallized with a coating 11 which is connected with an external element 12. The bore 10 is shown as being at right angles to the direction of drift of the charge carriers which is indicated by the arrow. The bore 13, which is also at right angles to the direction of drift and which is spaced from recess 10, is completely filled by a metal plug 14, the latter being connected to an external element 15. The third bore 16 is shown as being arranged near the metallized end surface of the semiconductor which serves as the anode, this bore being at right angles to the direction of drift and parallel to the anode. The bore is filled with semiconductor material of a conductivity type opposite that of the body 9 so that a pn-junction is formed from which can be taken off the rectified voltage which this pn-junction produces.

Figure 3:
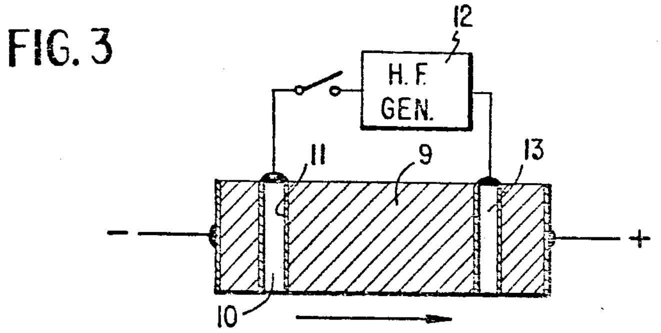
FIGS. 3 to 5 are sectional views of modifications of the invention according to the embodiment of FIG. 2 illustrating various arrangements for applying the controlled energy to the device via the hole or recess.
Figure 4:
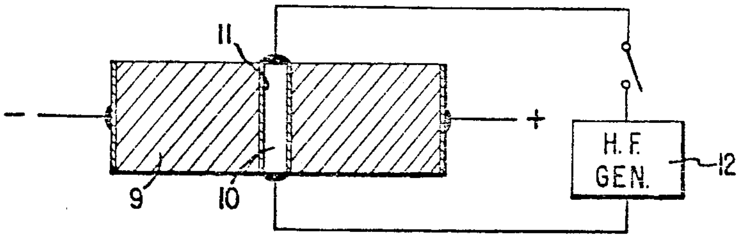
Figure 5:
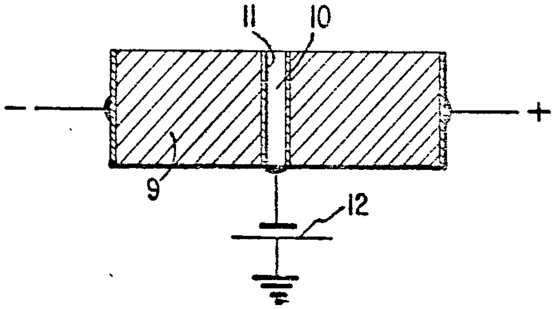

Depending on what elements are selected to serve as elements 12 and 15 — for example, additional voltage sources which can be switched in as desired, resistors, or short circuits, which can be connected in parallel or in series with a portion of the semiconductor 9 — the wave shape of the current flowing through the external circuit can be varied in an exceedingly large number of different ways. ( See Engelbrecht in Bell Laboratories Record, June 67, p. 196–197). A number of embodiments illustrating the specific manner in which the Gunn-effect device according to the invention as basically illustrated in FIG. 2 may be controlled are shown in FIGS. 3 to 5. According to the embodiment of FIG. 3, the semiconductor body 9 is provided with a pair of spaced bores or holes 10, 13 and indirect control of the oscillations in the Gunn-effect device is provided by means of a high-frequency source 12 electrically connected therebetween. In the embodiment according the FIG. 4, the semiconductor body 9 is provided with only a single bore 10, and the high-frequency source 12 is connected thereacross. In each of these embodiments, the high-frequency source may be used, for example, to modulate the oscillations of the Gunn-effect device. According to the modification of FIG. 5, the semiconductor body 9 is provided with a hole 10, the electrical contact 11 of which is connected to a d.c. source, whereby the contact 11 serves as a cathode for the device.

Figure 6:
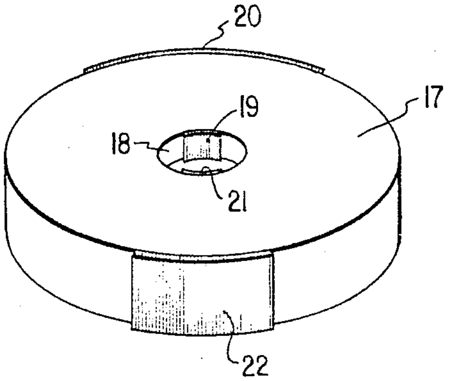
FIG. 6 is a perspective view of yet another embodiment of a Gunn-effect device according to the present invention, the same being disc shaped and having a central bore or hole.

FIG. 6 shows another embodiment of a Gunn-effect device according to the present invention, the same including a disc shaped semiconductor body 17 having a central bore 18. The semiconductor body may be any semiconductor material which, when suitably dimensioned and doped in a manner well known in the art, exhibits the Gunn-effect. Generally the semiconductor body 17, or at least the active layer thereof, is gallium-arsenide with a doping concentration $n_o = 10^{15\cdot}$ cm$^3$. The wall of this bore 18 is provided with two metal coatings or contacts 19 and 21 which are spaced and hence insulated from each other; the outer wall or edge of the disc is likewise provided with two spaced metal coatings 20 and 22 which are opposite the coatings 19 and 21, respectively. Either set or pair of inner and outer coatings, e.g., pair 19, 20 or pair 21, 22, can be connected to a suitable voltage source and serve as cathode and anode. In practice, one of the inner coatings, i.e., one of the coatings 19 and 21, will normally serve as the cathode. By suitably dimensioning the semiconductor body, two oscillations can be obtained simultaneously, or there can be obtained one oscillation and one amplification. It is possible, by differently doping the material between the electrodes, e.g., by doping the semiconductor material between electrodes or contacts 19 and 20 differently than between contacts 21 and 22, and/or by giving the semiconductor body a non-circular configuration, to obtain different frequencies which mutually modulate each other within a very large frequency spectrum. This mutual influencing can take place either in the semiconductor body itself or in an external component which is connected to the device and which has a non-linear characteristic. If the mutual influencing is provided within the semiconductor body itself, it will become greater as the circular sections formed by the contacts 19 and 20 or 21 and 22 increase. For example, if the arrangement of FIG. 6 is designed as two separate oscillators with different oscillating frequencies, e.g., by differently doping the semiconductor material between the respective parts of electrodes or by varying the geometry thereof (see FIGS. 7–9), and if the circular sector of each individual oscillator is rather large, the two oscillations will influence one another and modulate one another. This has the result that a plurality of frequencies which cover a wide frequency range are obtained in a very simple manner which offers a number of advantages, e.g., for use in jamming transmitters.

Figure 7:
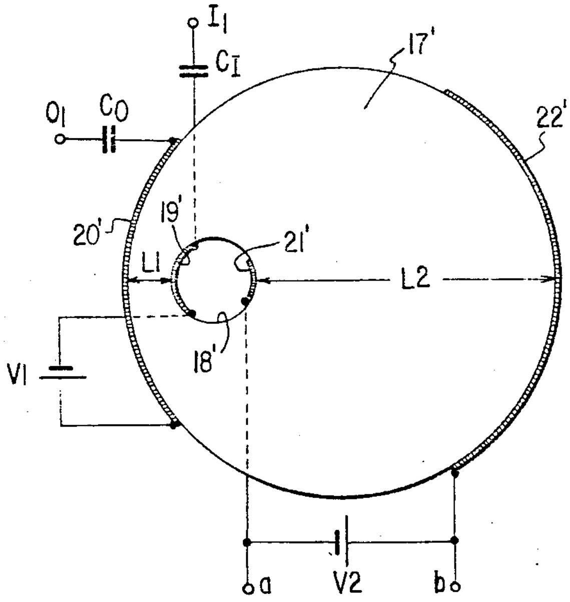
FIGS. 7 to 9 are plan views illustrating modifications and variations of the Gunn-effect device of FIG. 6.
Figure 8:
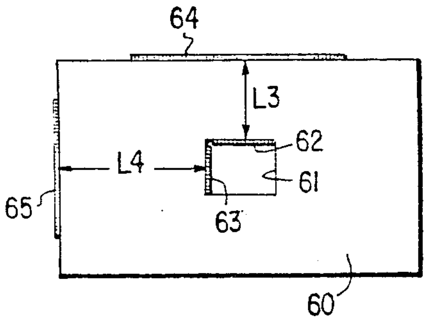
Figure 9:
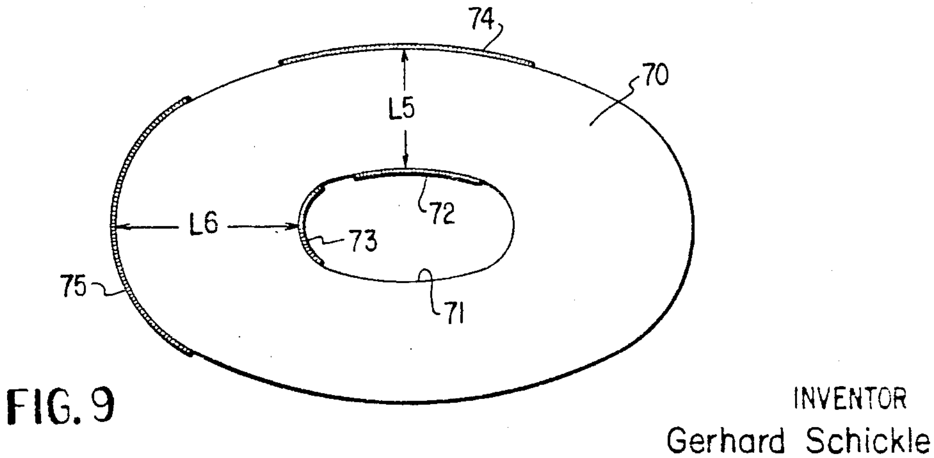

Turning now to FIGS. 7–9, there are shown illustrations of modifications of the embodiment of FIG. 6 whereby two different oscillation frequencies or amplification characteristics may be obtained. According to the modification shown in FIG. 7, the semiconductor body 17′ and the bore 18′ extending therethrough are still circular. However, in this case the bore 18′ is not located in the center thereof but rather is displaced so that it is closer to one edge thereof. Consequently, instead of the coaxial arrangement of FIG. 6, an eccentric arrangement is obtained. The wall of the circular bore 18′ is again provided with two spaced metal coatings or contacts 19′ and 21′ while the outer wall or edge of the disc shaped body 17′ is also provided with two spaced metal coatings or contacts 20′ and 22′ which are opposite the contacts 19′ and 21′, respectively. In the illustrated embodiment the pairs of contacts 19′, 20′ and 21′, 22′ are each arranged on the single diameter of the disc 17′ such that the distance $L_1$ between the contacts of one pair of contacts 19′, 20′ is the minimum possible distance, and the distance $L_2$ between the contacts of the other pair of contacts, 21′, 22′, is the maximum possible distance. It is to be understood, however, that other arrangements of the pairs of contacts may be utilized.

In the illustrated embodiment, the contacts 19′ and 21′ on the wall of the bore 18′ serve as the cathode electrodes for the device, while the contacts 20′ and 22′ serve as the respectively associated anode electrodes. Between the associated cathode and anode electrodes 19′ and 21′, a source of d.c. voltage $V_1$, is connected which biases the semiconductor body between the electrodes in the manner known in the art so that the desired operating conditions are attained, e.g., so that Gunn-effect oscillations are produced. The input terminal for the resulting Gunn-effect element is indicated by $I_1$, and as illustrated, may include a series capacitance $C_I$. The corresponding output terminal for this partial Gunn-effect element is indicated by $O_1$ and is isolated, as regards the direct current used to bias the semiconductor body, from the anode contact 20′ by a series capacitor $C_O$.

A second Gunn-effect element is formed in the same disc 17′ by connecting a further d.c. voltage source $V_2$ across the other associated pair of contacts, i.e., the cathode contact 21′ and the anode contact 22′. The input and output of this second partial Gunn-effect element can be provided in any known manner, e g., by a direct galvanic coupling of the signals to be coupled in or out via the terminals *a* and *b*. As a result of the different effective length of each of the partial Gunn-effect elements, different relative properties are attained, e.g., different relative frequencies of oscillation.

If the partial Gunn-effect elements are used as oscillators in the domain mode, then the conventional equation relationships for the dimensions thereof as regards the oscillating frequency apply, i.e., the oscillation frequency is proportional to the average drift speed of the charge carriers in the semiconductor body and inversely proportional to the effective length of the semiconductor body between the associated anode and cathode contacts. The effective length for the disc shaped Gunn-effect elements is the average length between the anode contact and the associated cathode contact and is indicated by $L_1$ and $L_2$ in FIG. 7. The somewhat complicated relationship regarding the average drift speed of the charge carriers in a doped semiconductor body is also known per se in the art, e.g., see "Die Telefunkenröhre" No. 47, December 1967, page 20.

In addition to the eccentric circular arrangement of FIG. 7, a plurality of Gunn-effect elements with different properties can be realized in a single semiconductor body in the manner shown in FIG. 8. In this embodiment, the semiconductor body 60 has a rectangular cross section and is provided with a centrally disposed rectangular bore or hole 61. A pair of cathode contacts 62, 63 are applied to adjacent portions of the rectangular wall of the semiconductor body within the opening or bore 61 and respectively associated anode contacts 64, 65 are applied to the portions of the edge of the semiconductor body 60 opposite the respective cathode contacts 62, 63. In this manner two partial Gunn-effect elements, one having an effective length of $L_3$ and the other of $L_4$ and hence different properties, are provided in a single semiconductor body. The respective pairs of contacts may be connected to the bias voltages and respective input and output terminals in the same manner as the embodiment of FIG. 7.

In a similar manner, as shown in FIG. 9, two partial Gunn-effect elements with different electrical characteristics may be provided in a single semiconductor body by providing a semiconductor body or disc 70 having an elliptical shape. In this embodiment the bore 71, which is also elliptically shaped, is centrally located in the disc 70. A pair of spaced contacts 72, 73, which are preferably cathode contacts, are provided on the semiconductor body wall within the bore 71 while respective associated contacts 74, 75 are formed on the outer edge of the semiconductor body 70. The associated cathode and anode contacts 72, 74 respectively are located along the minor axis of the elliptical body and define a Gunn-effect element having an effective length of $L_5$, while the part of contacts 73, 75 are located along the major axis of the device and define a Gunn-effect element having a different effective length $L_6$.

Figure 10:
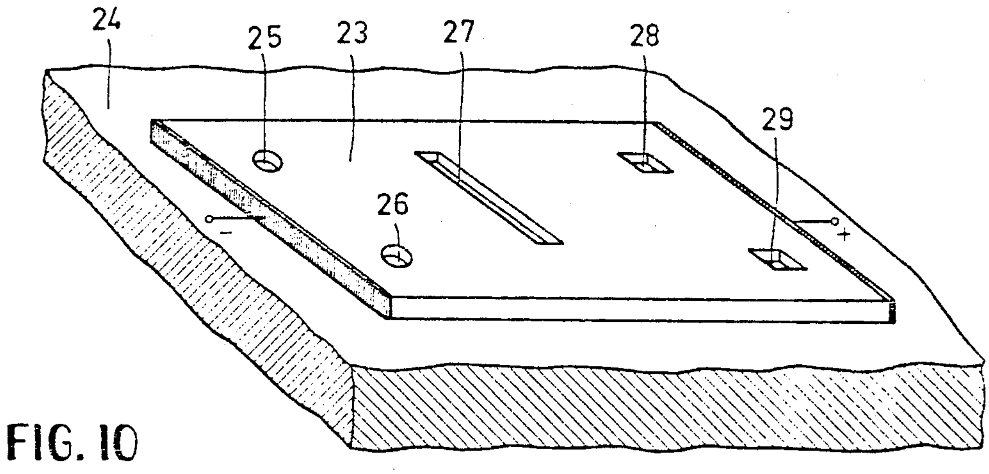
FIG. 10 is a perspective view of yet another embodiment of a Gunn-effect device according to the present invention, the same being adapted for use as a logic circuit.

In the embodiment of FIG. 10, the active layer of the semiconductor body 23 is applied epitaxially on a heat sink 24, the leads representing the cathode and anode being indicated by minus and plus signs. The layer has two bores 25 and 26 near the cathode. If the semiconductor body 23 is operated below the critical field strength and if this field strength is exceeded only when suitable signals are applied simultaneously via the signal input recesses or bores 25 and 26, the device functions as a logic circuit operating as an AND-circuit. The output signals can be divided by means of additional recesses 28 and 29, the same being suitably configured, i.e., positioned, dimensioned and/or contacted and which then function as auxiliary anodes or outputs. A fifth recess or bore 27, which is located between the main cathode and anode allows part of the high field zone which is propagating through the semiconductor body, or which is being built up therein, to be coupled out. In this way, there is obtained a logic circuit having a very short response time which is, in fact, shorter than the transit time of the high field zone through the entire semiconductor body to the anode. In the LSA mode, the number of ways in which the oscillation can be controlled is increased, and this, in turn, increases the useful applications of the device.

Figure 11:
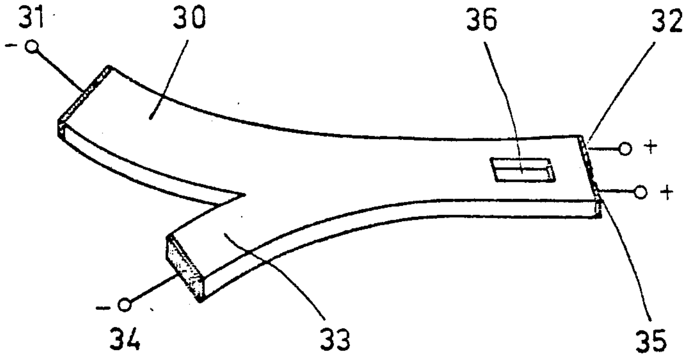
FIG. 11 is a perspective view of still another embodiment of a Gunn-effect device according to the present invention, the same including a bifurcated element.

In the embodiment of FIG. 11, the semiconductor body is bifurcated, the main portion joining two end portions 30, 33, whose end faces are provided with cathodes 31, 34, respectively, there being at the end of the main portion two anodes 32, 35, which are insulated from each other. While, in the interests of simplicity, the entire semiconductor body is shown as having a constant thickness, the same can have different thicknesses at different places and can, moreover, be bent throughout at least part of its length. If the device is so dimensioned that the two parts serve simultaneously as oscillators, the mixture of the frequencies can be taken off at the recess or bore 36. If a part of the device is to act as an amplifier, the recess or bore 36 can be dimensioned so as to make it possible to take out an amplified signal which, as explained above, can be rectified by means of a pn-junction layer.

Figure 12:
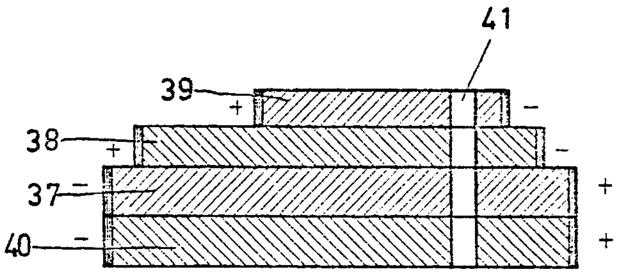
FIG. 12 is a sectional view of a still further embodiment of a Gunn-effect device according to the present invention, the same being adapted for frequency multiplying, converting, dividing or for delaying an input signal.

The embodiment of FIG. 12 is particularly suited for frequency multiplying, converting, dividing or delaying the input signal. The device shown in FIG. 12 incorporates a plurality of semiconductor bodies 37, 38, 39, 40, which are stacked into a single device, there being at least one bore or hole 41 which passes through the stack so that the bores in the semiconductor bodies are in alignment. If the two semiconductor bodies 37, 38, are to be used as oscillators, for example simultaneously, the semiconductor of 38 which is driven below the critical field strength can be triggered by coupling via the bore 41. Depending on the frequencies involved, there can be obtained a frequency conversion, depending on the critical length of the material or its doping. The device can, moreover, be used as a transit time delay element. This can be done by tapping all of the frequencies which are produced, whereupon the preferably pulse-shaped input signal applied to semiconductor body 40 is multiplied depending on the number of subsequent semiconductor elements 37, 38, the manner in which they are connected, and the specifics of the bore.

The semiconductor body 39 is likewise coupled to at least one of the other semiconductors by way of the illustrated bore, or by another bore, or by a contacted bore. The semiconductor body 39 can, for example, be so dimensioned that it acts as an amplifier.

Figure 13:
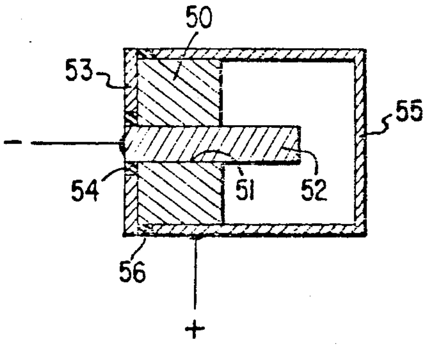
FIG. 13 is a sectional view of another embodiment of a Gunn-effect device according to the present invention wherein the device is incorporated in a resonant cavity.

According to further feature of the present invention, the semiconductor body can be so arranged that an ohmic coating which is fashioned as an electrode forms at least part of the wall of a wave guide, a tank circuit or an antenna; in the latter case, the second electrode which is part of the device serves simultaneously as a radiating element, with the high-frequency (radio-frequency) energy being coupled in and/or out by way of the recess. FIG. 13 illustrates an embodiment of such a Gunn-effect device according to the invention included within and forming a part of a coaxial cavity. As shown in FIG. 13, the semiconductor body 50 is provided with a central bore 51 which is filled with a metal contact 52 which extends beyond the surfaces of the body 50, and which is connected to a suitable pole of a voltage source, as indicated, to serve as the cathode for the device. The semiconductor body 50 and the contact 52 are mounted on a metal base 53 with the contact 52 being insulated therefrom by means of an insulating layer or ring 54. The anode contact for the semiconductor body 50 is provided by means of a metal layer 55 which is ohmically connected to the external surface or wall of the semiconductor body 50, and which forms the outer wall of the coaxial cavity. The wall 55 is insulated from the base 53 by means of a further ring of insulating material 56.

The devices according to the invention can be manufactured by not applying the active layer at suitable places so that the bores will be formed during the manufacture. Alternatively, the bores can be formed after the active layer has been completed, for example, by means of laser beams. Dimensioning of a semiconductor to act as an amplifier or oscillator is taught, for example, by Heinlein in Electronics Letters, Vo. 2, Nov. 66, pages 417 – 418.

The following are illustrative and not limitative examples of the present invention:

EXAMPLE 1

A semiconductor body having the configuration shown in FIG. 1*a* and made of n-type gallium arsenide has a length $l = 100\mu$, a width $w = 100\mu$, and a height $h = 50\mu$. The recess 4 has the following dimensions: $A = B = 40\mu$, $C = 80\mu$, $D = E = H = 10\mu$, $G = 30\mu$, $F = 20\mu$. The recess 4 extends throughout the entire width $w$ of the semiconductor body. Without a recess 4, the wave shape was found to be flat. When a d.c. voltage is applied across anode and cathode whose electric field strength exceeds the critical value for the semiconductor the output current has a complex shape similar to that depicted in FIG. 1*b*. This "fixed" waveform between the pulses 5 and 6 has a slope of amplitude like the shape of the cross section of the semiconductor which is tapered by the recess 4. Another recess means another waveform. Similar apparatus for generating those fixed waveforms is described by Engelbrecht in Bell Laboratories Record, June 1967, on page 196.

EXAMPLE 2

A semiconductor body with the configuration of FIG. 6 made of n-type gallium arsenide with one internal contact and one external contact serves as a concentric planar diode. The inner contact with a radius of $50\mu$ serves as the cathode; the outer contact is the anode and has a radius of $100\mu$. The epitaxial active layer layer was $8\mu$ in thickness. The frequency of this concentric diode is tunable by the applied d.c. voltage. The concentric configuration makes it easy to use this diode in concentric lines.

EXAMPLE 3

A semiconductor body with the configuration of FIG. 9 made of n-type gallium arsenide with a doping concentration of about $10^{15} \cdot cm^{-3}$ has a distance L6 of $100\mu$ and a bore 71 the longer axis of it has a length of $100\mu$, too. Contact 75 serving as anode was four times longer as the cathode 73. The oscillation frequency was about 1 GHz. Between the contacts 72 and 74 on the disk 70 arranged in a same manner with a central distance of $80\mu$ exists an oscillation the frequency of it was about 1.3 GHz. The length of the contacts seems not be critical. The active layer of the semiconductor body 70 was $50\mu$ in thickness applied epitaxially on a heat sink.

It will be understood that the above description of the present invention is susceptible to various modifications, changes and adaptations, and the same are intended to be comprehended within the meaning and range of equivalents of the appended claims.

I claim:

1. A Gunn-effect device comprising: a suitably doped III – V-semiconductor body having a hole extending therethrough at right angles to the direction of drift of charge carriers in said body; anode and cathode contacts for said semiconductor body including at least one metal contact on the outer edge of said semiconductor body and at least one metal contact on the wall of said semiconductor body defining said hole and opposite said contact on the outer edge.

2. The Gunn-effect device defined in claim 1 wherein said anode and cathode contacts include a pair of spaced metal contacts on the outer edge of said semiconductor body, and a pair of spaced metal contacts on the wall of said semiconductor body defining said hole, each of said contacts on the outer edge being opposite one of said contacts on the said wall defining said hole whereby each pair of oppositely disposed contacts and the portion of the semiconductor body therebetween defines a separate Gunn-effect element.

3. The Gunn-effect device defined in claim 1 wherein said semiconductor body is a circular disc and wherein said hole is disposed in the center thereof.

4. The Gunn-effect device defined in claim 2 wherein said semiconductor body is a circular disc.

5. The Gunn-effect device defined in claim 4 wherein said hole is circular and disposed in the center of said disc.

6. The Gunn-effect device defined in claim 4 wherein said hole is displaced from the center of said disc whereby the distance between each of said pairs of oppositely disposed contacts is different.

7. The Gunn-effect device defined in claim 2 wherein said semiconductor body is an elliptically shaped disc and wherein said hole is elliptically shaped and disposed in the center of said disc.

8. The Gun-effect device defined in claim 7 wherein one pair of said oppositely disposed contacts is located along the minor axis of said semiconductor body and the other pair of said oppositely disposed contacts is located along the major axis of said semiconductor body.

9. The Gunn-effect device defined in claim 2 wherein said semiconductor body and said hole are rectangular with the respective sides thereof being parallel and wherein said pairs of oppositely disposed contacts are on adjacent sides of said rectangular body.

10. The Gunn-effect device defined in claim 9 wherein said hole is disposed in the center of said semiconductor body.

* * * * *